Sept. 16, 1958     M. W. PETERSEN     2,852,082
MECHANICAL ROCK PICKER
Filed March 29, 1955     2 Sheets-Sheet 1
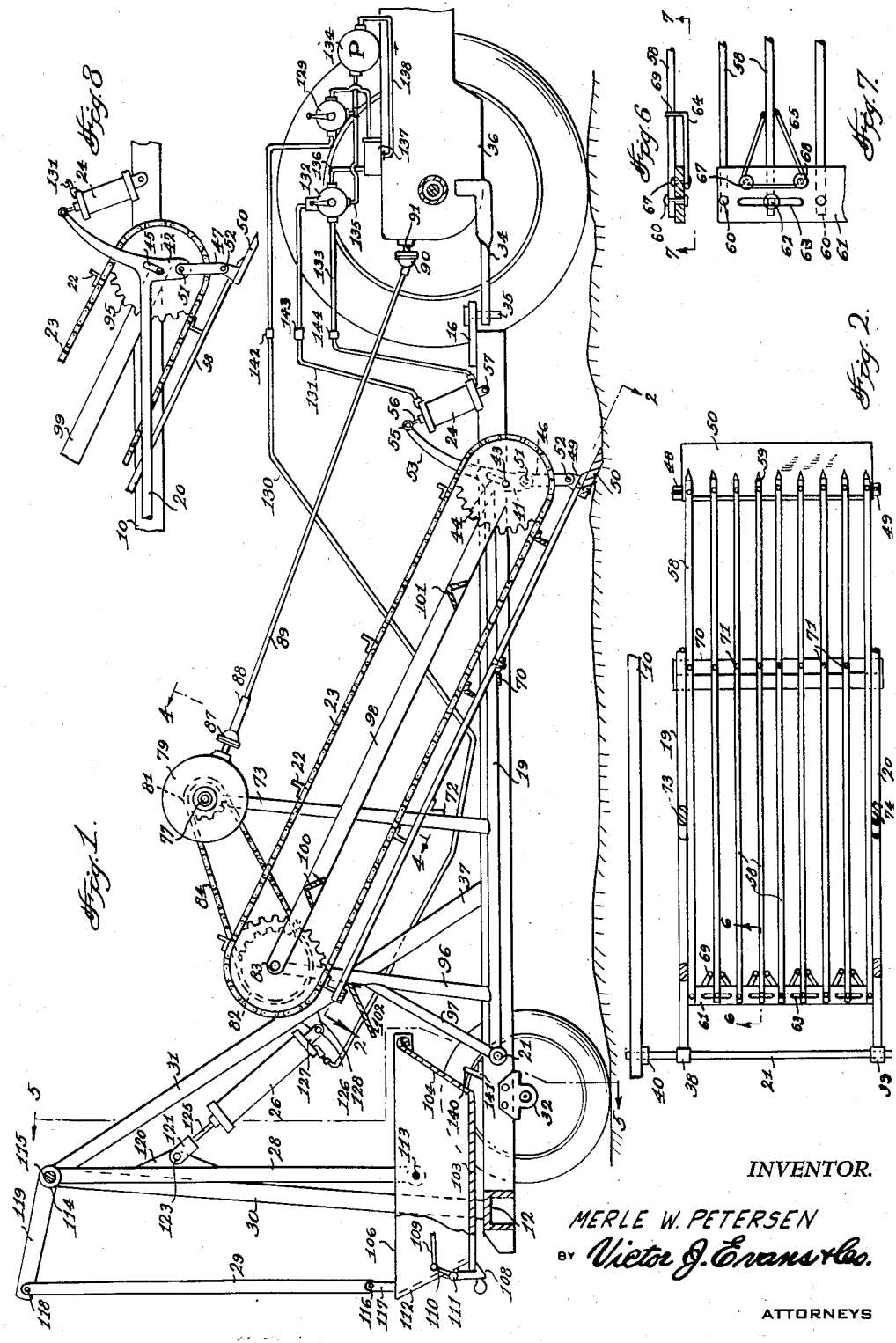
INVENTOR.
MERLE W. PETERSEN
BY *Victor J. Evans & Co.*
ATTORNEYS Sept. 16, 1958    M. W. PETERSEN    2,852,082
MECHANICAL ROCK PICKER
Filed March 29, 1955    2 Sheets-Sheet 2
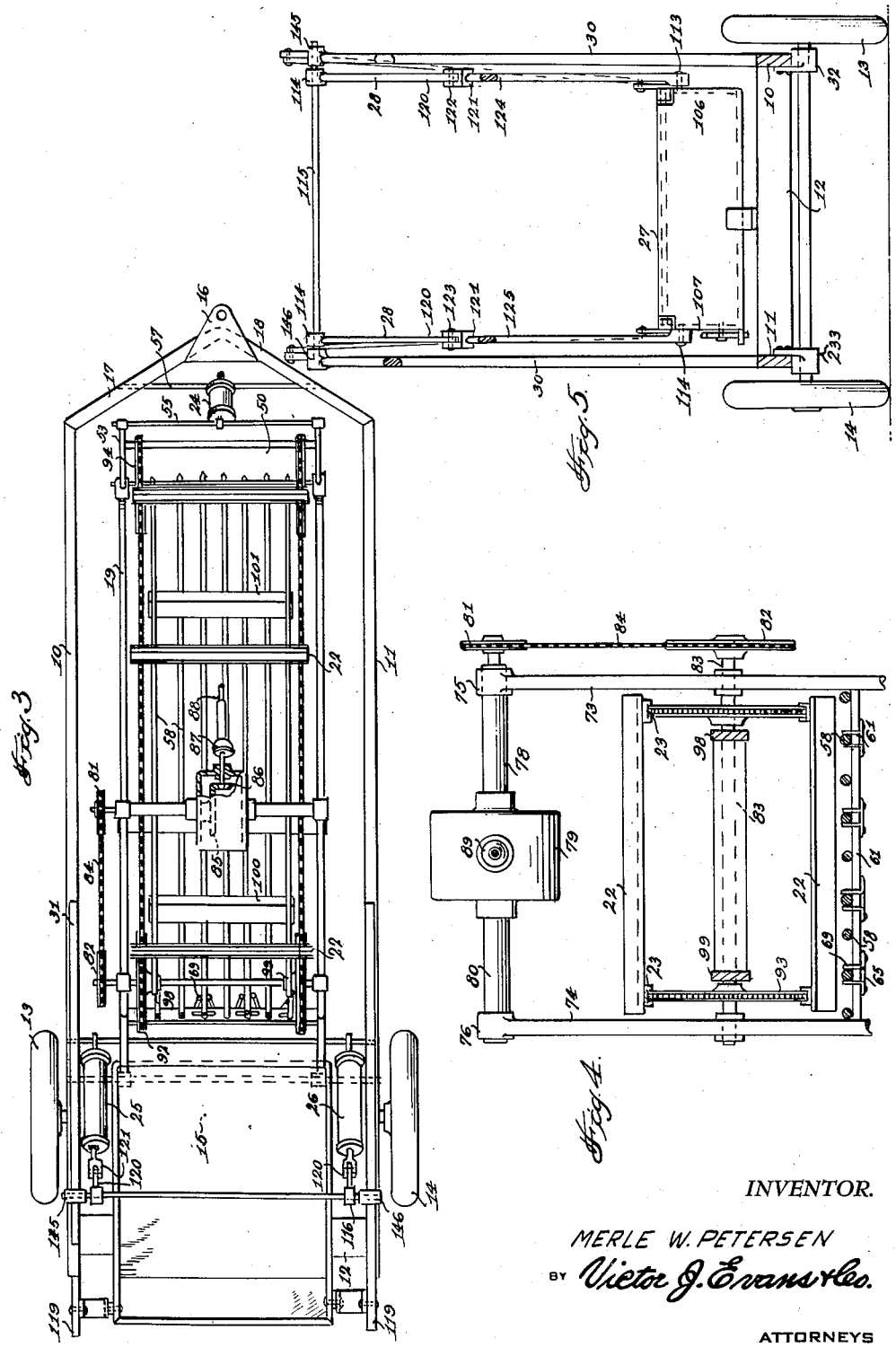
INVENTOR.
MERLE W. PETERSEN
BY *Victor J. Evans & Co.*
ATTORNEYS United States Patent Office 2,852,082
Patented Sept. 16, 1958

2,852,082

MECHANICAL ROCK PICKER

Merle W. Petersen, Brady, Mont., assignor of fifty percent to Bruce H. Petersen, Brady, Mont.

Application March 29, 1955, Serial No. 497,654

2 Claims. (Cl. 171—63)

This invention relates to agricultural implements such as used for removing rocks from the soil, and in particular, a rock removing machine having an inner frame with elongated tines mounted therein with the tines parallel and in spaced relation, and an outer frame having wheels at the rear and a hitch for connecting the frame to a tractor on the forward end in which the inner frame is suspended in an inclined position whereby lower forward ends of the tines rake soil over which the machine travels picking up rocks that are carried rearwardly by a scraper conveyor and deposited in a hopper on the outer frame and wherein the lower end of the inner frame is vertically adjustable by means of a hydraulic cylinder and the hopper that receives the rocks is adapted to be elevated for dumping the rocks into the body of a wagon or truck.

The purpose of this invention is to provide a complete rock removing machine whereby rocks raked by tines from the ground are adapted to be deposited in a truck or wagon periodically or as desired.

Various types of devices have been provided for raking rocks from the soil, however, it has been found difficult to remove rocks of different sizes and it is also difficult to provide storage space for the rocks wherein a sufficient number of rocks may accumulate to provide a load for a truck, wagon, or the like. With these thoughts in mind, this invention contemplates a mechanical rock picking mechanism wherein a scraper conveyor for carrying rocks upwardly over spaced parallel tines to a receiving hopper is adapted to move vertically to compensate for rocks of different sizes and also in which the tines and conveyor and rock dumping instrumentalities are controlled by hydraulic cylinders.

The object of this invention is, therefore, to provide an improved mechanical rock picking machine that is adapted to be attached to a tractor and that is adapted to operate for removing rocks of different sizes.

Another object of the invention is to provide an improved mechanical rock picking machine in which the force required to pick the rocks from the ground and also the force required to elevate and dump the rocks into a wagon or truck is obtained by hydraulic means. Another important object of the invention is to provide a rock picking mechanism in which rocks are carried over spaced parallel tines by a conveyor in which means is provided for preventing large rocks wedging between tines of the picking mechanism.

A further object of the invention is to provide an improved rock picking machine in which the machine is of a simple and economical construction.

With these and other objects and advantages in view, the invention embodies an outer horizontally disposed frame carried by wheels and adapted to be connected to a towing tractor with a hitch, an inner frame having inclined spaced parallel tines and conveying means mounted thereon, a rock receiving hopper positioned on the rear portion of the outer frame and hydraulic elements for adjusting the elevation of the lower end of the inner frame and for elevating and dumping the rock receiving hopper.

Other features and advantages of the invention will appear from the following description, taken in connection with the accompanying drawings, wherein:

Figure 1 is a longitudinal section through the improved mechanical rock picker showing the tines lowered for raking rocks from soil over which the machine travels.

Figure 2 is a sectional plan of the inner frame taken on line 2—2 of Figure 1 showing the tines with the conveyor and elevating elements omitted.

Figure 3 is a plan view of the machine.

Figure 4 is a cross section through the upper end of the inclined inner frame taken on line 4—4 of Figure 1 illustrating the transmission elements of the conveyor.

Figure 5 is a cross section taken on line 5—5 of Figure 1 showing the rock receiving hopper and supporting elements thereof.

Figure 6 is a section taken on line 6—6 of Figure 2 showing a spring on one side of one of the tines which permits lateral movement of the tines to prevent rocks wedging between the tines.

Figure 7 is a view looking upwardly toward the under surface of a portion of the upper tine mounting bar taken on line 7—7 of Figure 6.

Figure 8 is a side elevational view of the lower end of the inner frame showing one of the slots for permitting the conveyor to move upwardly to provide passage for a large rock.

Referring now to the drawings, wherein like reference characters denote corresponding parts, the improved mechanical rock picker of this invention includes an outer frame or chassis having side beams 10 and 11, a cross beam 12 at the rear, wheels 13 and 14 carried by an axle 15 and a hitch plate 16 mounted on inwardly extended ends 17 and 18, an inner frame having side rails 19 and 20 pivotally mounted in the side beams 10 and 11 of the outer frame with a rod 21, a conveyor having flights 22 on chains 23 mounted on the inner frame, a hydraulic cylinder 24 mounted in the outer frame and connected to the inner frame for adjusting the elevation of the lower end of the inner frame, hydraulic cylinders 25 and 26 supported from the side beams 10 and 11 of the outer frame for actuating the picker to discharge rock and a rock receiving hopper 27 suspended by arms 28 and 29 from end supports having substantially vertically disposed posts 30 and struts 31.

The axle 15 on the ends of which the wheels 13 and 14 are mounted is rotatably mounted in bearings 32 and 33 on the side beams 10 and 11, respectively, and the hitch plate 16 is pivotally connected to a hitch bar 34 with a bolt or king pin 35. The bar 34 extends from a tractor housing, such as indicated by the numeral 36. The lower ends of the bars 30 are secured to the side beams 10 and 11 at the ends of the cross beam 12 and the lower ends of the struts 31 are secured, such as by welding, to upper surfaces of the beams 10 and 11 at points 37 which are spaced forwardly from the cross beam 12.

The side rails 19 and 20 of the inner frame are mounted by bearings 38 and 39 on the shaft 21 and the shaft 21 is pivotally mounted in the side beams 10 and 11 of the outer frame or chassis, the shaft being retained in position with set collars, as indicated by the numeral 40 and shown in Figure 2.

The forward ends of the rails 19 and 20 are provided with enlarged webs 41 and 42 in which a tailshaft 43 of the conveyor formed with the flights 22 and chains 23 is rotatably mounted. The ends of the shaft are mounted in slots 44 and 45 that permit vertical adjustment whereby the flights 22 of the conveyor are adapted to move upwardly to receive large rocks and the like. Lower parts of the webs 41 and 42 are connected by links 46 and 47 to ears 48 and 49 of a transversely disposed scraper blade 50, upper ends of the links being connected to the webs 41 and 42 with pins 51 and the lower ends being pivotally connected to the ears 48 and 49 with pins 52.

The webs 41 and 42, at the forward ends of the rails 19 and 20, are provided with upwardly extended arcuate arms 53 and 54, the upper ends of which are pivotally connected with a pin or rod 55 to a piston rod 56 extended from the pressure cylinder 24, the lower end of the cylinder being pivotally connected by a rod 57 to the inclined sections 17 and 18 of the main or outer frame.

The lower or inner frame is provided with spaced longitudinally disposed parallel rods or tines 58, the lower ends of which are secured by bolts or other suitable fasteners to the scraper blade 50, as indicated at points 59, and, as illustrated in Figures 6 and 7, upper ends of alternate tines are secured by bolts 60 to a cross bar 61 with tines between the alternate tines provided with a yielding connection to prevent rocks, and the like, wedging between the tines. The tines between the tines connected to the cross bar 60 with the bolts 61 are provided with pins 62 that extend through elongated slots 63 and the tines are retained in positions midway between the tines held by the bolts 60 with arms 64 and 65 of a spring 66 which is secured by bolts 67 and 68 to the crossbar 61. The ends of the arms 64 and 65 extend upwardly and over the tines providing U-shaped sections, as indicated by the numeral 69 in Figure 6. The tines are also supported at an intermediate point with a bar 70 extended between the side rails 19 and 20 and, as shown in Figure 2, alternate tines are connected with bolts 71, similar to the bolts 60, to the bar 70.

The tines 58 of the inner inclined frame are also supported by a cross bar 72 upon which the tines rest, and which is supported by vertically disposed struts 73 and 74 through hubs 75 and 76 on the upper ends of which a shaft 77 extends. The shaft 77 is rotatably mounted in a section 78 extended from one side of a gear housing 79, the opposite side of which is supported with a section 80 from the hub 76 on the upper end of the strut 74. A sprocket 81 on the extended end of the shaft 77 is aligned with a sprocket 82 on a headshaft 83 of the conveyor 23 and a chain 84 trained over the sprockets 81 and 82 provides means for driving the conveyor from the shaft 77, the inner end of which is provided with a beveled gear 85 that meshes with a beveled pinion 86 in the gear block or housing 79. The gear 86 is connected through a universal joint 87 to a telescoping joint 88 on the upper end of a driving shaft 89 which is connected by a universal joint 90 to a power take-off shaft 91 of the tractor, as indicated by the numeral 36. The headshaft 83 of the conveyor is provided with sprockets 92 and 93 over which the conveyor chains 23, with the flights 22 thereon, are trained. The lower ends of the chains are trained over sprockets 94 and 95 on the tailshaft 43. The headshaft 83 is supported from the side rails 19 and 20 with struts 96 and the struts are reinforced with diagonally positioned braces 97.

The headshaft 83 and the tailshaft 43 of the conveyor are retained in spaced relation with bars 98 and 99, which are journaled on the shaft, and the bars are supported laterally with transversely disposed struts 100 and 101.

The upper end of the inner or conveyor frame is provided with a deflecting plate 102 that is positioned to receive rocks and the like from the conveyor and that provides a chute directing the rocks into the hopper 27.

The hopper 27, which is suspended by the arms 28 and 29, is provided with a hinged bottom including a section 103 and a rear wall 104 and, as illustrated in Figure 1, the upper edge of the wall 104 is pivotally mounted with a rod 105 between end walls 106 and 107. The extended edge of the bottom 103 is retained in position by a latch 108 that is adapted to be actuated by a cable 109 extended from an arm 110 positioned beyond a pivot point 111 on a side wall 112.

The lower ends of the arms 28 are pivotally connected with pins 113 to the end walls 106 and 107 of the hopper and the upper ends, which are provided with bearings 114 are pivotally mounted on a rod 115 connecting upper ends of the posts 30.

The lower ends of the arms 29 are pivotally connected by pins 116 to brackets 117 extended upwardly from the side walls 106 and 107 of the hopper 27, and the upper ends are pivotally connected by pins 118 to bars 119 which extend from the upper ends of the posts 30 and struts or braces 31.

The arms 28 are provided with plates 120 to which clevises 121 are connected with pins 122 and 123, and the clevises are secured on the upper ends of piston rods 124 and 125, the piston rods extending from the cylinders 25 and 26. The lower ends of the cylinders are pivotally mounted on the braces or struts 31 which extend from the side beams 10 and 11 of the main frame or chassis with pins 126 which extend through lugs 127 on lower ends of the cylinders and also through ears 128 on under surfaces of the struts 31.

The cylinders 25 and 26 are supplied with fluid under pressure from a manually actuated valve 129 on a towing tractor through a tube 130, the tube 130 having a cross connection therein extended to the cylinder at the opposite side of the frame.

One end of the cylinder 24 is connected by a tube 131 to a valve 132 on the tractor and the opposite end of the cylinder is connected by a tube 133 to another port of the valve whereby fluid under pressure may be supplied from a pump 134 through a tube 135 to the valve. The return of the valve is connected by a tube 136 to a reservoir 137 and the reservoir is connected to the intake of the pump 134 with a tube 138.

Pressure applied to the ends of the cylinder 24 raises and lowers the scraper blade 50 that is adapted to pick up rocks and the like from the ground and the flights of the conveyor chains carry the rocks upwardly, depositing the rocks into the hopper 27.

Pressure applied to the cylinders 25 and 26 through the tubes 130 carries the hopper 27, with rocks therein, upwardly with the arms 28 and 29 assuming positions as indicated by broken lines 139 wherein the hopper may be positioned over a body of a wagon or truck and with the hopper in this position a force exerted on the cable 109 actuates the latch 108 to release the bottom whereby the rocks may be deposited in a body of a truck or wagon. In the return movement an angle iron 140 on the lower edge of the hopper strikes a crossbar 141 on the frame whereby the hopper is retained in position and with continued operation of the machine rocks and the like are deposited therein.

With the parts designed and assembled as illustrated and described, the main frame, including the side beams 10 and 11, is attached to a hitch bar of a towing tractor, such as by the king pin 35, and the hydraulic supply tubes are connected to tubes of the tractor, such as by couplings 142, 143 and 144 whereby the parts of the device are adapted to be actuated by an operator upon the tractor with the hopper 27 depositing rocks and the like delivered thereto into a body of a wagon, truck, or the like.

The height of the supporting structure, including the posts 30 and braces 41, for the hopper may be varied as desired and the shaft 115 upon which the arms 28 are pivotally mounted and which is pivotally mounted in bearings 145 and 146 at the upper ends of the posts may be of any suitable size and may be reinforced as may be desired.

It will be understood that modifications, within the scope of the appended claims, may be made in the design and arrangement of the parts without departing from the spirit of the invention.

What is claimed is:

1. In a stone extricator, the combination which comprises a horizontally disposed outer frame including side beams connected by cross beams, a transversely disposed axle mounted in the side beams of the outer frame and positioned in the rear portion thereof, frame supporting wheels mounted on the axle, a hitch for connecting the forward end of the frame to a tractor, an inner frame including laterally spaced side rails with spaced parallel longitudinally positioned rods between the side rails, cross members connecting the side rails, the inner frame being inclined upwardly from the leading end to the trailing end, a transversely disposed tail shaft mounted on and extended across the lower end of the inner frame, sprockets mounted on the tail shaft of the inner frame and positioned at the sides of the frame, a transversely disposed head shaft mounted on the upper end of the inner frame, sprockets mounted on the head shaft and positioned in alignment with the sprockets of the tail shaft, endless chains trained over the sprockets of the head and tail shafts, spaced transversely disposed flights carried by the chains, the head and tail shafts being mounted whereby flights of the chains carry rocks upwardly along the spaced rods of the inner frame, a scraper blade carried by the leading end of the inner frame, the scraper blade being positioned to penetrate soil over which the picker is traveling for removing rocks and depositing the rocks on the spaced rods where the rocks are picked up by the flights, struts mounted on the outer frame and pivotally supporting the upper end of the inner frame in an elevated position, a hydraulic cylinder mounted on the outer frame and connected to the leading end of the inner frame for adjusting the elevation of the lower end of the inner frame and also of the scraper blade carried thereon, a gear housing mounted on the outer frame, an endless chain trained over sprockets on the head shaft and gear housing for driving the head shaft from the gear housing, a driving shaft for connecting the gear housing to the power take-off of a tractor, a hopper carried by the outer frame and positioned to receive rocks from the upper end of the inner frame, a rod pivotally mounting the bottom of the hopper on the outer frame, a latch for retaining the bottom of the hopper in the closed position, means for mounting the latch on the upper portion of the hopper, a cable extended from the latch for actuating the latch from a tractor, a vertically disposed frame upon which the hopper is mounted on the outer frame, struts supporting the vertically disposed frame from the outer frame, and hydraulic cylinders mounted on the struts connecting the frame to the outer frame and operatively connected to the hopper for actuating the parts thereof to a dumping position.

2. In a stone extricator, the combination which comprises a horizontally disposed outer frame including side beams connected by cross beams, a transversely disposed axle mounted in the side beams of the outer frame and positioned in the rear portion thereof, frame supporting wheels mounted on the axle, a hitch for connecting the forward end of the frame to a tractor, an inner frame including laterally spaced side rails with spaced parallel longitudinally positioned rods between the side rails, cross members connecting the side rails, the inner frame being inclined upwardly from the leading end to the trailing end, a transversely disposed tail shaft mounted on and extended across the lower end of the inner frame, sprockets mounted on the tail shaft of the inner frame and positioned at the sides of the frame, a transversely disposed head shaft mounted on the upper end of the inner frame, sprockets mounted on the head shaft and positioned in alignment with the sprockets of the tail shaft, endless chains trained over the sprockets of the head and tail shafts, spaced transversely disposed flights carried by the chains, the head and tail shafts being mounted whereby flights of the chains carry rocks upwardly along the spaced rods of the inner frame, a scraper blade carried by the leading end of the inner frame, the scraper blade being positioned to penetrate soil over which the picker is traveling for removing rocks and depositing the rocks on the spaced rods where the rocks are picked up by the flights, struts mounted on the outer frame and pivotally supporting the upper end of the inner frame in an elevated position, a hydraulic cylinder mounted on the outer frame and connected to the leading end of the inner frame for adjusting the elevation of the lower end of the inner frame and also of the scraper blade carried thereon, a gear housing mounted on the outer frame, an endless chain trained over sprockets on the head shaft and gear housing for driving the head shaft from the gear housing, a driving shaft for connecting the gear housing to the power take-off of a tractor, a hopper carried by the outer frame and positioned to receive rocks from the upper end of the inner frame, a rod pivotally mounting the bottom of the hopper on the outer frame, a latch for retaining the bottom of the hopper in the closed position, means for mounting the latch on the upper portion of the hopper, a rod carried between and mounted in upper ends of the posts, depending arms pivotally mounted on the rod and pivotally connected to side walls of the hopper, bars also pivotally mounted on the rod mounted in upper ends of the posts and extended rearwardly from said rod, arms pivotally mounted in extended ends of the bars and pivotally connected to the trailing end of the hopper which with the arms depending from the rod provided parallelogram whereby with the piston of the hydraulic cylinder mounted on the struts supporting the posts connected to the arms depending from the rod and connected to the side walls of the hopper actuated to extend the piston rod the hopper swings outwardly for dumping rocks beyond the end of the outer frame.

References Cited in the file of this patent

UNITED STATES PATENTS

| 1,722,932 | Mandel | July 30, 1929 |
| 1,858,708 | Hoffmeister | May 17, 1932 |
| 2,141,557 | Reiter | Dec. 27, 1938 |
| 2,553,240 | Cintula | May 15, 1951 |
| 2,636,328 | Jochim | Apr. 28, 1953 |